No. 780,619.                                                         Patented January 24, 1905.

UNITED STATES PATENT OFFICE.

ROBERT PSCHORR, OF BERLIN, GERMANY, ASSIGNOR TO THE FIRM OF
J. D. RIEDEL, OF BERLIN, GERMANY.

MORPHIN COMPOUND AND PROCESS OF MAKING SAME.

SPECIFICATION forming part of Letters Patent No. 780,619, dated January 24, 1905.

Application filed October 20, 1904. Serial No. 229,255.

*To all whom it may concern:*

Be it known that I, ROBERT PSCHORR, a subject of the German Emperor, residing at Kurfürstendamm 25, Berlin, Germany, have invented certain new and useful Improvements in and Connected with Morphin Compounds, of which the following is a specification.

Among the salts of quaternary bases of morphin-methyl-ether (codein) only the iodin-methylate, the chlorin-methylate, iodin-ethylate, and the sulfate-methylate are known, and as regards the corresponding derivatives of morphin-ethyl-ether only the iodin-methylate is known. All these compounds are unsuitable for pharmaceutical purposes. (V. Fränkel, *Arzneimittelsynthese*, page 294.)

I have discovered that the salts of quaternary bases differ considerably as regards their physiological effect and that by converting the morphin-alkyl-ethers into the quaternary bromin-alkylates medicinal compounds may be obtained which are easily soluble in water and retain the valuable properties of the morphin-alkyl-ethers, while the toxic effect, which seriously interferes with their practical use, is greatly reduced. Owing to this considerable abatement of the poisonous effect, the physician is not tied to so narrow limits in prescribing the doses and may therefore produce the desired codein effect in many cases where codein itself would be dangerous or where it fails owing to the limited doses.

For producing the new quaternary bromin-alkylates, which are so valuable as medicaments, I may start from the morphin-alkyl-ethers by converting them into the quaternary bromin-alkylates by known methods or from quaternary morphin salts, which are converted into alkyl-ethers by known methods, after which, in case bromin-alkylate has not been employed, the resulting quaternary salts are converted into bromin-alkylates or directly from morphin by converting the same into the quaternary salt of morphin-alkyl-ethers with alkali and an alkylizing medium in the proportion of one molecule of the former to two or more molecules of the latter and (in case bromin-alkylate has not been used for alkylizing) converting the quaternary salts thus obtained into the bromin-alkylate in the known manner.

For producing the codein-bromin-methylate, $C_{18}H_{21}NO_3(BrCH_3,)$ which is eminently valuable for therapeutic purposes, it is advantageous to start from the morphin, three hundred and three grams of morphin being dissolved in one liter of alcoholic potash solution containing from fifty-six to sixty grams of potassium hydrate, after which two hundred and forty grams of methyl-bromid are added, and the mixture is heated in a closed receptacle to 50° to 60° for several hours. After cooling, the crystal paste thus obtained is removed by suction, washed with some cold spirit, and extracted with methyl or ethyl alcohol for separating the potassium bromid. The codein-bromin-methylate remaining after distilling off the alcohol is further purified by recrystallizing it from hot water. Instead of potassium hydrate, sodium hydrate and earthy alkalies or anhydrous alcoholic solutions of potassium and sodium may be employed. The formation of codein-bromin-methylate takes place according to the following equation:

$$C_{17}H_{19}NO_3 + KOH + 2BrCH_3 =$$
(Morphin)
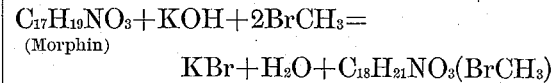

Codein-bromin-methylate is remarkable for its great power of crystallization. From saturated aqueous solution it separates out on cooling in the shape of large coffin-shaped crystals or in small hard hexagonal prisms. From mixtures of water and acetone it crystallizes in hard prismatic crystals shining like glass. It melts at 261° centigrade and dissolves in about three-fourths of its weight of boiling water or in two to three times its weight of cold water. It is moderately soluble in warm methyl alcohol, difficult to dissolve in ethyl alcohol, very sparingly soluble in acetone and chloroform, and insoluble in ether and benzin. An aqueous solution of codein-bromin-methylate has a neutral reaction and a bitter taste. If the solution is acidulated with nitric acid, it gives with silver nitrate a precipitate of silver bromid. On the addition of ferric-chlorid solution the aqueous solution becomes slightly yellow. Picric acid produces a yellow crystalline precipitate, mercuric chlorid a yellowish-white, phosphoric-molybdic acid a yellowish-brown, and phosphoric-tungstic acid a flesh-colored precipitate. In pure concentrated sulfuric acid codein-bromin-methylate is soluble in the cold, yielding a colorless solution, while hydro-bromic acid escapes, after which the solution soon assumes a yellow color, especially on heating.

The same product (codein-bromin-methylate) may be obtained by causing morphin-alkali to act on methyl-bromid instead of causing alkali and methyl-bromid to act on morphin in the manner described.

What I claim is—

1. The process for the production of codein-bromin-methylate, which consists in causing methyl-bromid to act on morphin and alkali, substantially as described.

2. The process for the production of codein-bromin-methylate, which consists in causing methyl-bromid to act on morphin and alkali in the proportion of one molecule of morphin to one molecule of alkali and several molecules of methyl-bromid, substantially as described.

3. The process for the production of codein-bromin-methylate, which consists in heating an alcoholic solution of morphin and caustic alkali with methyl-bromid, allowing the product to cool and separating the crystal paste thus obtained, producing an alcoholic extract of the latter, distilling off the alcohol contained in the extract, and purifying the residue by recrystallization from hot water, substantially as described.

4. The process for the production of codein-bromin-methylate, which consists in heating an alcoholic solution of morphin and caustic alkali with methyl-bromid, in the proportion of one molecule of morphin to one molecule of alkali and two molecules of ethyl-bromid, to 50° to 60° centigrade for several hours in a closed receptacle, allowing the product to cool, separating the crystal paste thus obtained, producing an alcoholic extract of the latter, distilling off the alcohol contained in the extract, and purifying the residue by recrystallization from hot water, substantially as described.

5. As a new article of manufacture, codein-bromin-methylate $C_{18}H_{21}NO_3(BrCH_3)$, which is a bitter and chemically-neutral body with melting-point at 261° centigrade and great capacity for crystallization, easily soluble in water, moderately soluble in warm methyl alcohol, sparingly soluble in acetone, not soluble in ether and benzin, capable of yielding with picric acid a yellow crystalline precipitate, with mercuric chlorid a yellowish white, and with phosphoric-molybdic acid a flesh-colored precipitate, and capable of being decomposed by concentrated sulfuric acid, while giving off hydrobromic acid, substantially as described.

In testimony whereof I have hereunto set my hand in presence of two subscribing witnesses.

ROBERT PSCHORR.

Witnesses:
   JOSEF PSCHORR,
   AUG. PSCHORR.